(12) United States Patent
Djerf et al.

(10) Patent No.: US 8,728,376 B2
(45) Date of Patent: May 20, 2014

(54) RESTORING AND RECYCLING RAILROAD TIES

(75) Inventors: Torben Djerf, Grand Saline, TX (US); John D. Eisenhut, Canton, OH (US)

(73) Assignee: TJ Technology Holdings, LLC, Canton, OH (US)

( * ) Notice: Subject to any disclaimer, the term of this patent is extended or adjusted under 35 U.S.C. 154(b) by 331 days.

(21) Appl. No.: 13/013,168

(22) Filed: Jan. 25, 2011

(65) Prior Publication Data

US 2012/0187204 A1   Jul. 26, 2012

(51) Int. Cl.
*B29C 45/14* (2006.01)
*B29C 73/02* (2006.01)
*E01B 9/14* (2006.01)

(52) U.S. Cl.
USPC ........ 264/279; 264/273; 264/36.1; 264/36.22

(58) Field of Classification Search
None
See application file for complete search history.

(56) References Cited

U.S. PATENT DOCUMENTS

| | | | |
|---|---|---|---|
| 6,336,265 B1 * | 1/2002 | Niedermair | 29/460 |
| 2009/0178731 A1 * | 7/2009 | Ollendick | 144/330 |

* cited by examiner

*Primary Examiner* — Benjamin Schiffman
(74) *Attorney, Agent, or Firm* — Renner, Kenner, Greieve, Bobak, Taylor & Weber, Co., L.P.A.

(57) ABSTRACT

A method for restoring and reusing railroad ties and the resulting product are disclosed. According to the method, otherwise spent wooden ties are sorted as to their apparent suitability for providing a core for reuse. Those found unsuitable are discarded, while those found to be suitable are milled or trimmed about their dimensions to define a suitable core. That core is banded about a transverse perimeter and then submitted to a reaction injection molding process by which urethane or other suitable polymers impregnate the various voids, holes and cracks in the core, bond with the bands, and define a finish unit having the overall size and configuration of previously known railroad ties. The encapsulated product is then capped or plugged at the ends to ensure that the resulting product is impervious to penetration by the environment.

10 Claims, 1 Drawing Sheet

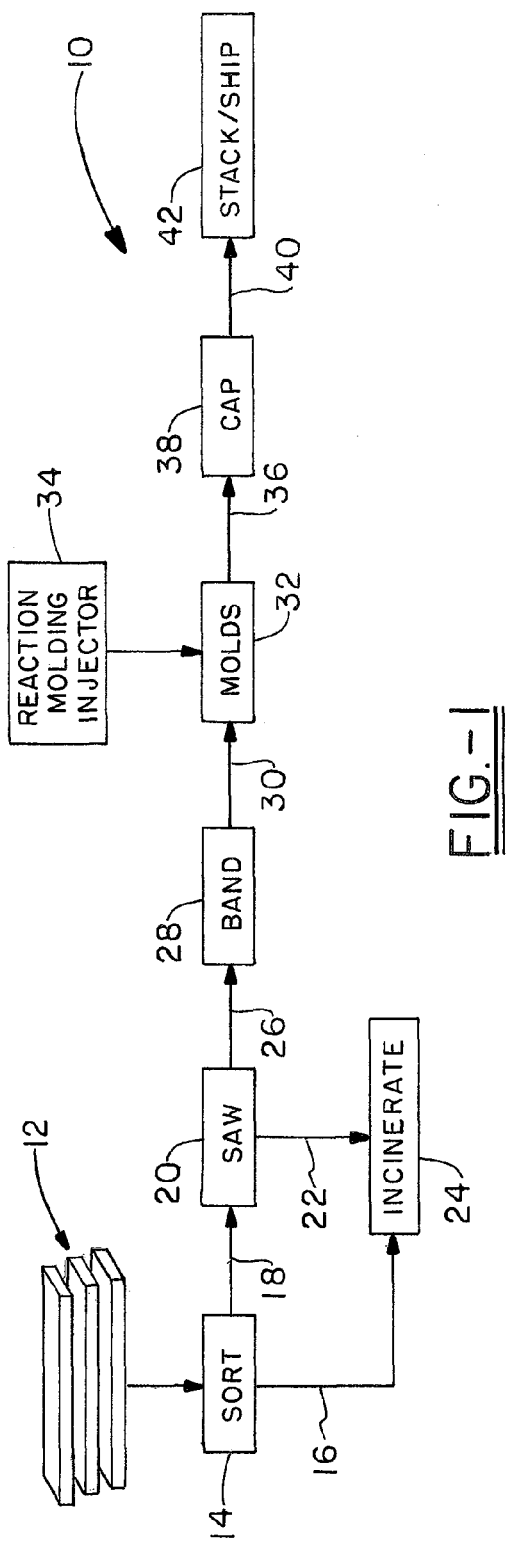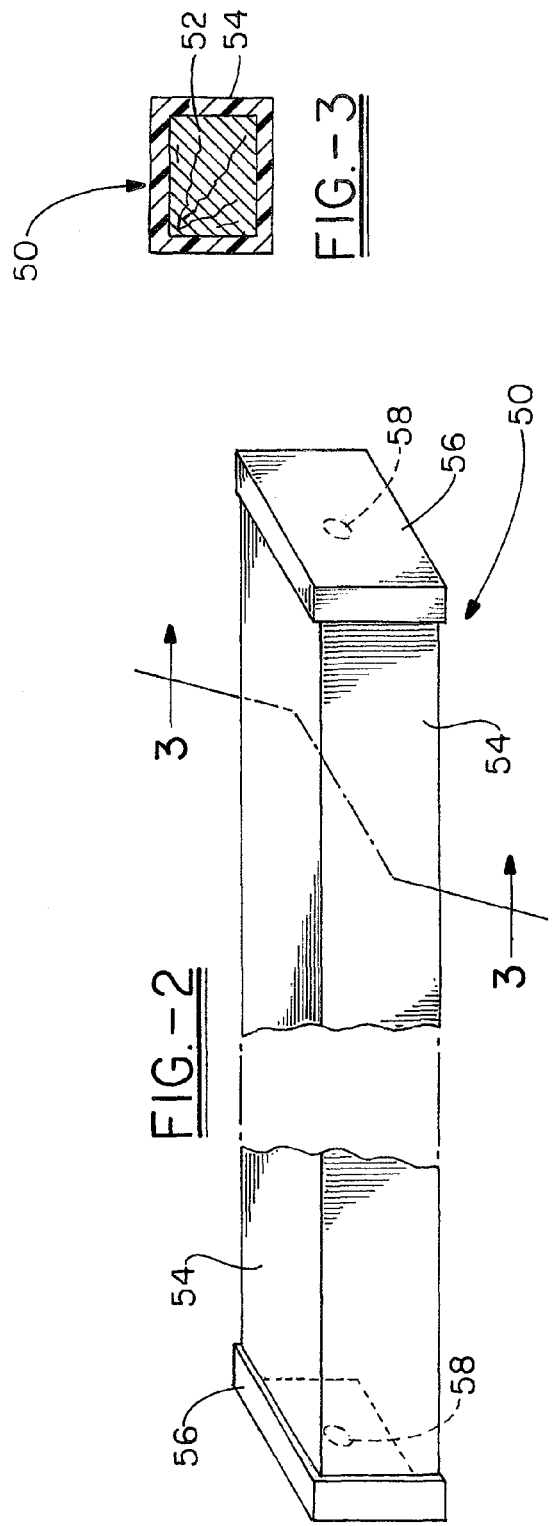

US 8,728,376 B2

RESTORING AND RECYCLING RAILROAD TIES

TECHNICAL FIELD

The invention herein resides in the art of the manufacture of railroad ties and similar structures. More particularly, the invention relates to a methodology for restoring and recycling otherwise spent railroad ties. The invention specifically relates to a methodology and resulting product in which the core of an otherwise spent railroad tie is strengthened and restored, and thereafter encased in a binding polymer to form a synthetic railroad tie of standard size, shape and configuration.

BACKGROUND ART

Mass transportation by rail is becoming increasingly recognized as a viable and cost effective means of transportation, particularly in a day of rising fuel costs. However, there are significant problems attendant to rail transportation, particularly those associated with the costs of maintenance and repair. The wooden ties upon which rails are laid have a finite life, resulting from exposure to the environment and the beating taken as trains pass thereover. As the trains pass, pulsing forces are imparted to the ties, and particularly at the areas of joinder of the rails to the ties. As a consequence, the railroad spikes loosen, moisture enters, and the ties crack, split and rot. Typically known railroad ties are of a solid wood construction, but are often coated with creosote or other arsenic containing fluids, which have a tendency to leech into the ground and waterways, giving rise to significant environmental issues.

The material and labor costs incident to the removal and replacement of wooden railroad ties is exceedingly high. Indeed, the disposal of spent ties is also problematic due to their containment of creosote, arsenic-based preservatives, and the like.

There is a need in the art for longer lasting railroad ties than those presently employed. There is further a need in the art for a methodology by which spent railroad ties may be restored and reused. Yet further, there is a need in the art for railroad ties that do not pose environmental hazards or risks.

DISCLOSURE OF INVENTION

In light of the foregoing, it is an aspect of an embodiment of the invention to provide railroad ties that enjoy a far longer life than previously known ties.

A further aspect of an embodiment of the invention is the provision of railroad ties that do not pose environmental risks or hazards.

Still a further aspect of an embodiment of the invention is the provision of railroad ties that use as their core reinforced and restored cores of otherwise "spent" wooden ties.

Still an additional aspect of an embodiment of the invention is the provision of a methodology by which the cores of otherwise spent wooden ties are restored and then encased in a polymer.

An additional aspect of an embodiment of the invention is the provision of a methodology by which the restoration and remanufacture of composite wood-polymer railroad ties is given to a continuous process with high throughput.

Still a further aspect of an embodiment of the invention is the provision of railroad ties that are a composite of recycled wooden cores in a polymeric case that are cost effective in manufacture and use, without sacrificing durability or performance.

The foregoing and other aspects of the invention that will become apparent as the detailed description proceeds are achieved by a method of restoring and reusing railroad ties, comprising: sorting a quantity of spent railroad ties on the basis of apparent suitability for providing a core for reuse; developing cores by removing selected portions of those railroad ties deemed suitable for providing cores for reuse; and over molding said cores for reuse with a polymeric shell.

Other aspects of the invention that will become apparent herein are achieved by a method for manufacturing composite railroad ties from spent wood ties, comprising: removing to a selected depth all of the surface areas of a railroad tie, thereby forming a wood core; banding about selected portions of said wood core as needed to ensure structural integrity; introducing said banded wood core into a mold cavity; and injecting polymeric material into said mold cavity, thereby establishing a polymeric shell over said core as said polymeric material cures.

Additional aspects of embodiments of the invention are attained by a composite railroad tie, comprising: a wood core formed from a milled spent wood tie; and a polymeric shell encasing said wood core.

DESCRIPTION OF DRAWINGS

For a complete understanding of the various aspects of embodiments of the invention, reference should be made to the following detailed description and accompanying drawings wherein:

FIG. 1 is a flow diagram of a process of an embodiment of the invention;

FIG. 2 is a perspective view of a restored and recycled railroad tie made in accordance with embodiments of the invention; and FIG. 3 is a cross sectional view of the railroad tie of FIG. 2, taking along the line 3-3.

DETAILED DESCRIPTION OF A PREFERRED EMBODIMENT OF THE INVENTION

Presented below is a description of a preferred embodiment of the invention, it being understood and appreciated by those skilled in the art that the invention does not require each and every element or feature described below, and that additional features or elements may be included, singularly or in combination, in keeping with the concepts of the invention. Further, while the invention is presented in the context of standard railroad ties, which are typically 8' 6"×9"×7", the invention is applicable to a broad range of timbers.

Referring now to the drawings and more particularly FIG. 1, it can be seen that a restoring and recycling process according to an embodiment of the invention is designated generally and schematically by the numeral 10. The process commences with a stack of used or "spent" wooden railroad ties which have typically been removed from a railway bed during maintenance procedures. This stack of ties 12 is sorted as at 14 on the basis of sufficient integrity for recycled use pursuant to the invention. Here, an inspector, either manual or automated, inspects each of the ties for rot, decay, holes and bores, elongated splits, and the like. Those ties which do not appear to have sufficient integrity for use in accordance with the invention are discarded as unsuited as at 16. In the course of developing the invention, it has been found that approximately half of the ties sorted from the stack 12 will be found to be structurally unsuited for use in providing a core for a laminated tie and, accordingly, will be discarded at 16. Those found to be acceptable, will pass as at 18 to a sawing or milling mechanism 20. In a preferred embodiment of the invention the sawing or milling mechanism 20 is computerized and is adapted to remove preset or operator-selectable thicknesses of material from the top, bottom, sides and ends of those ties deemed acceptable as at 18. The trimmed waste from the sawing or milling operation 20 is discarded at 22. What remains is a wooden core. That core is further inspected as a part of the sawing and milling operation 20 and, if the core is then observed to be unsuited for serving as a core for the remaining process, it is also discarded at 22. As shown, the discarded ties at 16 and the discarded trimmed waste and cores at 22 are passed to an incinerator 24, where they are destroyed in accordance with environmental regulations. It will be appreciated that the portions removed from the top, bottom, sides and ends of the railroad ties during the sawing or milling operation 20 will typically be to a depth sufficient to substantially remove the creosote and/or arsenic contained wood, which is then incinerated as at 24.

The remaining cores, those found to have suitable structural integrity, are passed as at 26 to a banding operation 28. Here, bands are placed about the transverse perimeter of the cores to provide and ensure structural integrity to the cores for the remainder of the operation. It will be appreciated that an acceptable core at 26 may still be characterized by bores, holes, and splits. The banding operation ensures the structural integrity of these cores during the remainder of the cycle. It has been found that anywhere from three to five such bands are suitable for this purpose, although many cores would require no such banding. The invention contemplates that a standard uniform number of bands are routinely placed about the transverse perimeter of all cores, or that the bands may be placed by operator selection. These bands may be of any suitable nature but are typically a polypropylene or fiber-reinforced urethane. It will be appreciated that bands employed at 28 will necessarily be compatible with the polymer employed in the next subsequent operation.

Each of the banded tie cores 30 is passed as at 30 to one of a plurality of molds 32. The molds 32 are in parallel, and the number employed is determined by the processing rate desired and the throughput to be enjoyed. The invention contemplates at least two or three molds, since the curing time in each mold is on the order of 2-3 minutes, and the embodiment of the invention presently under consideration anticipates the production of one tie per minute.

Each of the molds 32 is connected to a reaction molding injector 34, which comprises a pressurized source of liquid polymer, such as urethane or the like. Accordingly, the molding process is a reaction injection molding process, with the amount of urethane being injected into the mold 32 by the reaction molding injector 34 being a function of the size of the core, and the number of cracks, voids, holes, or the like that must be filled with the urethane to totally fill the mold. Unlike a "shot" injector, which is based on a fixed volume of injection, reaction injection molding only terminates the injection process when a particular pressure has been sensed at the mold, indicating that all conceivable cracks, crevices, holes and bores have been filled. Following the injection process, the mold 32 cures the injected urethane, the curing process taking on the order of 2-3 minutes. The molding is done under elevated temperature and pressure.

The actual placement of the cores within the molds 32 may be achieved in various ways. Presently, it is contemplated that one or more pins will engage each of the opposite ends of the core and hold it suspended within the mold during the injection and curing process. It is further contemplated that the pins may be retracted near the end of the injection process, with the core being held in place by the urethane previously injected, allowing the urethane to then cover the areas previously sealed by the pins. Alternatively, it is contemplated that the pins will remain intact during the curing process, leaving small exposed areas at each of the ends of the encapsulated core at the end of the molding operation. In such a case, which is the preferred case at this time, the encapsulated core is passed as at 36 to a capping operation 38. Here, a cap of polymeric material may be reactively bonded to each of the ends of the encased core, thus completing the recycled railroad tie as a 40. The caps are preferably reactively bonded to the urethane encasing the core and, in one embodiment, they go completely around and slip over the end portions of each of the ties or, alternatively, they constitute urethane or otherwise compatible plugs that are placed into and are actively bonded with the apertures left by the retracted pins during the molding process. The plugs are sized for a tight and smooth fit in each of the respective holes. The reactive bonding may be by means of any appropriate adhesive such as a urethane based adhesive.

At 40, the finish recycled tie, comprising a wooden core encased in polyurethane and appropriately capped or plugged at the ends, is received at 40. The molds 32 are sized such that the finished ties presented at 40 are of the standard size employed as railroad ties, as to length, width and depth. These ties are stacked and shipped as at 42.

With reference now to FIGS. 2 and 3, it can be seen that a finished tie made in accordance with the process of FIG. 1 is designated generally by the numeral 50. The tie 50 has a wooden core 52 with its cracks, voids, holes and the like pressure filled with an appropriate polymer, which further serves to establish the polymer shell 54. Caps 56 are appropriately secured or bonded to the polymer shell 54 at the ends of the tie 50, as shown. Alternatively, or in addition, plugs 58 of a compatible polymer are employed to fill the holes in the polymer shell 54 that remained as a result of end pins holding and retaining the wooden core 52 during the molding operation at 32.

Thus it can be seen that a method for restoring and recycling railroad ties, as well as the resulting product of such process, has been presented and described above. The process and resulting product are cost effective in manufacture and reliable and durable in operation, extending the life of railroad ties significantly beyond those enjoyed by the wooden railroad ties of the past. Thus it can be seen that the various aspects of the invention have been presented and described above with regard to particular embodiments of the invention. However, the invention is not limited thereto or thereby. Rather, the invention is as claimed below.

What is claimed is:

1. A method of restoring and reusing railroad ties, comprising:

sorting a quantity of spent railroad ties on a basis of apparent suitability for providing a core for reuse;

developing cores by removing selected portions of those railroad ties deemed suitable for providing cores for reuse;

over molding said cores for reuse with a polymeric shell; and wherein at least certain of said cores for reuse are banded in selected areas about lateral perimeters prior to said step of over molding, said step of over molding comprising reaction injection molding of a polymer, and wherein said step of banding employs polymeric bands that are compatible with said polymer employed in said reaction injection molding process.

2. The method of restoring and reusing railroad ties according to claim 1, wherein said step of removing selected portions comprises removal of predetermined surface area thicknesses by sawing.

3. The method of restoring and reusing railroad ties according to claim 1, wherein said over molding step produces composite ties having a wood core and a polymeric shell and being of consistent external dimensions.

4. The method of restoring and reusing railroad ties according to claim 3, further comprising the step of finishing opposite end portions of said ties with finishing elements taken from the group of caps and plugs.

5. The method of restoring and reusing railroad ties according to claim 4, wherein said caps and plugs are formed from a polymeric material.

6. The method of restoring and reusing railroad ties according to claim 1, further comprising a step of sorting said cores for reuse and setting aside those cores deemed unsuited for over molding.

7. The method of restoring and reusing railroad ties according to claim 6, wherein said railroad ties and cores not selected for reuse as cores for over molding are incinerated along with said selected portions removed from said railroad ties deemed suitable for providing cores.

8. A method for manufacturing composite railroad ties from spent wood ties, comprising:
   removing to a selected depth all of the surface areas of a railroad tie, thereby forming a wood core;
   banding about selected portions of said wood core as needed to ensure structural integrity;
   introducing said banded wood core into a mold cavity;
   injecting polymeric material into said mold cavity, thereby establishing a polymeric shell over said core as said polymeric material cures; and
   wherein said step of banding employs bands that are compatible with said polymeric material, wherein said molding operation comprises reaction injection molding ensuring a pressurized fill of said polymeric material into cracks, holes and voids of said core, and wherein said band is formed of a material taken from the group of polypropylene and fiber-reinforced polyurethane, and said polymeric material comprises polyurethane.

9. The method for manufacturing composite railroad ties from spent wood ties according to claim 8, wherein said step of removing a selected depth is effected by a milling operation.

10. The method for manufacturing composite railroad ties from spent wood ties according to claim 9, wherein said milling operation is performed by a saw.

\* \* \* \* \*